United States Patent
Kumar et al.

(10) Patent No.: US 11,625,584 B2
(45) Date of Patent: Apr. 11, 2023

(54) RECONFIGURABLE MEMORY COMPRESSION TECHNIQUES FOR DEEP NEURAL NETWORKS

(71) Applicant: Intel Corporation, Santa Clara, CA (US)

(72) Inventors: Raghavan Kumar, Hillsboro, OR (US); Gregory K. Chen, Portland, OR (US); Huseyin Ekin Sumbul, Portland, OR (US); Phil Knag, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 16/443,548

(22) Filed: Jun. 17, 2019

(65) Prior Publication Data

US 2019/0303750 A1    Oct. 3, 2019

(51) Int. Cl.
*G06N 3/063* (2006.01)
*G06N 3/084* (2023.01)
*G06F 7/544* (2006.01)

(52) U.S. Cl.
CPC ........... *G06N 3/063* (2013.01); *G06F 7/5443* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 8,977,627 B1* | 3/2015 | Vijayanarasimhan | G06V 10/40 707/747 |
| 2014/0129568 A1* | 5/2014 | Kim | G06F 12/1018 707/747 |
| 2018/0197067 A1* | 7/2018 | Mody | G06F 7/5443 |
| 2018/0204113 A1* | 7/2018 | Galron | G06Q 30/0631 |
| 2019/0050709 A1* | 2/2019 | Yang | G06F 16/9014 |

OTHER PUBLICATIONS

Zhu, J. et al., BHNN: a Memory-Efficient Accelerator for Compressing Deep Neural Networks with Blocked Hashing Techniques, 2017, IEEE, pp. 690-695. (Year: 2017).*

Spring, R. et al., Scalable Sustainable Deep Learning via Randomized Hashing 2017, ACM, pp. 445-454. (Year: 2017).*

Hariprasath, FPGA Implementation of multilayer feed forward neural network arcitecture using VHDL, 2012, IEEE, 6 pages. (Year: 2012).*

(Continued)

*Primary Examiner* — Eric Coleman
(74) *Attorney, Agent, or Firm* — Compass IP Law PC

(57) ABSTRACT

Examples described herein relate to a neural network whose weights from a matrix are selected from a set of weights stored in a memory on-chip with a processing engine for generating multiply and carry operations. The number of weights in the set of weights stored in the memory can be less than a number of weights in the matrix thereby reducing an amount of memory used to store weights in a matrix. The weights in the memory can be generated in training using gradients from back propagation. Weights in the memory can be selected using a tabulation hash calculation on entries in a table.

22 Claims, 12 Drawing Sheets

(56) References Cited

OTHER PUBLICATIONS

Extended European Search Report for Patent Application No. 20164427.5, dated Sep. 17, 2020, 7 pages.

Kai Sheng Tai et al: "Finding Heavily-Weighted Features in Data Streams", arxiv.org, Cornell University Library, Nov. 7, 2017, 33 pages.

Zhu Jingyang et al: "BHNN: A memory-efficient accelerator for compressing deep neural networks with blocked hashing techniques", 2017 22nd Asia and South Pacific Design Automation Conference (ASP-DAC), IEEE, Jan. 16, 2017 (Jan. 16, 2017), pp. 690-694, 6 pages.

Andrej Karpathy et al., "Evolution Strategies as a Scalable Alternative to Reinforcement Learning", Mar. 24, 2017, https://openai.com/blog/evolution-strategies/, 3 pages.

Caiwen Ding et al., "CirCNN: Accelerating and Compressing Deep Neural Networks Using Block-Circulant Weight Matrices", Cambridge, MA, USA, MICRO-50, Oct. 14-18, 2017, 14 pages.

Maksym Kholiavchenko, "Iterative Low-Rank Approximation For CNN Compression", Innopolis University, Russia, Mar. 23, 2018, 5 pages.

R/learnmachinelearning, "Alternative to Back Propagation" https://www.reddit.com/r/learnmachinelearning/comments/6jrvmd/alterna . . . taken from the internet May 6, 2019, 2 pages.

Shuochao Yao et al., "Network Compression and Speedup", Jul. 2016, http://isca2016.ees.umich.edu/wp-content/uploads/2016/07/4A-1.pdf, 70 pages.

Song Han, "Compressing and Regularizing Deep Neural Networks", Nov. 10, 2016, O'Reilly Media, https://www.oreilly.com/ideas/compressing-and-regularizing-deep-neural, p. 11.

Steven Miller, "Mind: How to Build a Neural Network (Part One)" Aug. 10, 2015, https://stevenmiller888.github.io/mind-how-to-build-a-neural-network/, 12 pages.

Wenlin Chen et al., "Compressing Neural Networks with the Hashing Trick", Proceedings of the 32nd International Conference on Machine Learning, Lille, France, 2015, 10 pages.

Wikipedia, "Tabulation Hashing" Jun. 9, 2018, https://en.wikipedia.org/wiki/Tabulation_hashing, 4 pages.

Xiyu Yu et al., "On Compressing Deep Models by Low Rank and Sparse Decomposition", Honolulu, HI USA, Published in 2017 IEEE Conference on Computer Vision and Pattern Recognition (CVPR), Jul. 21-26, 2017, 10 pages.

* cited by examiner

RECONFIGURABLE MEMORY COMPRESSION TECHNIQUES FOR DEEP NEURAL NETWORKS

TECHNICAL FIELD

Various examples described herein relate to storage and retrieval of matrix weight values for a neural network.

BACKGROUND

In the context of artificial intelligence (AI) and machine learning (ML), Deep Neural Networks (DNNs) are becoming increasingly popular for performing tasks such as object classification, object detection, speech recognition, and other inferences. DNNs find applications in both performance driven servers and power optimized edge devices. State-of-the-art DNNs have multiple densely connected layers that require low compute intensity (e.g., operations per bit) and allow for minimal data reuse. Examples of low compute intensity environments include multilayer perceptron (MLP) and long short-term memory (LSTM). Due to the growing size of datasets, the model size (e.g., number of parameters in the network) is also growing very quickly. As the size of a model increases, the number of weights and activations increase. This translates into an increase in memory requirements on and off-chip to store these parameters. The size of the weights used by these models often exceeds the total amount of memory available on-chip with the accelerator, and data transfer between an external memory (e.g., dynamic random access memory (DRAM), disk, or solid state drive) and the accelerator incurs significant energy overhead and delay in availability of data. The input/output (I/O) memory bottleneck created by these low compute intensities in networks can lead to hardware underutilization and can limit the advantages of technology scaling.

DETAILED DESCRIPTION

Figure 1:
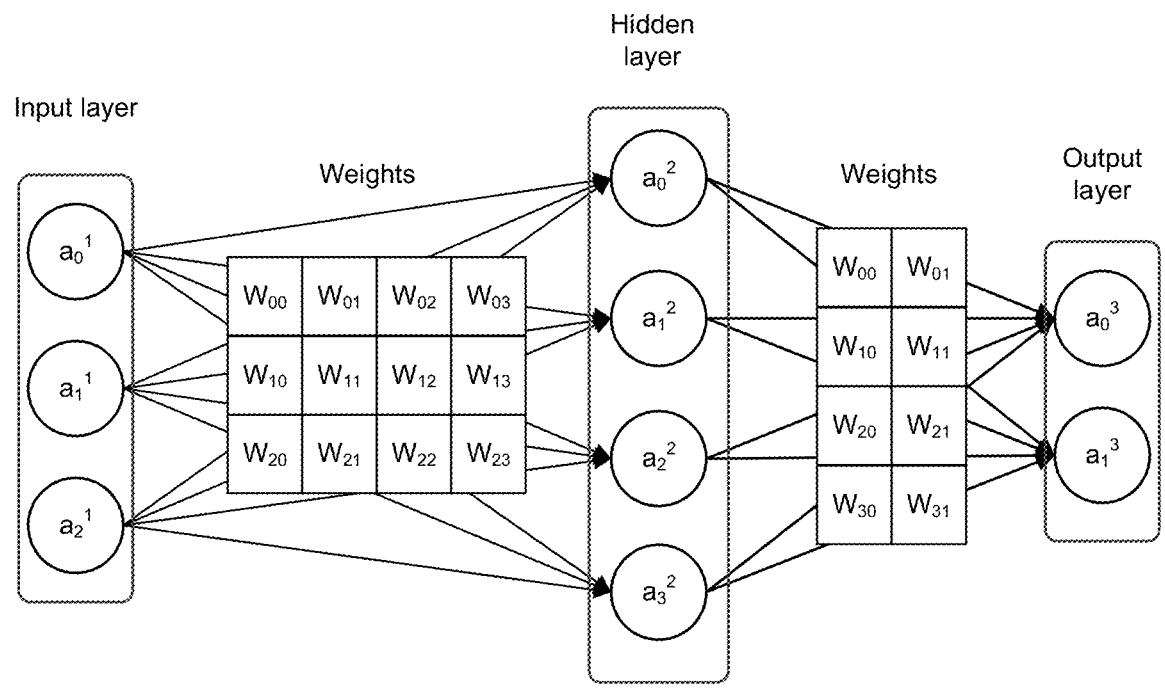
FIG. 1 depicts an example of fully-connected neural network.

Existing solutions to reduce memory footprint of a NN model include reduced bit precision, sparsity/pruning, and so forth. Reducing bit precision (quantization) involves training the network with high precision values through error back propagation and quantizing values during the feed forward operation. Sparsity/pruning technique involves an iterative training process to remove redundant parameters such that the degradation in accuracy is minimal.

Quantized neural networks such as binary (−1/1 weights) and ternary (−1/0/1 weights) networks can provide approximately 8-16 times reduction in model size when compared to a half-precision floating-point network. However, to achieve similar network performance, the quantized networks often have to be scaled up in model size, thereby losing a significant portion of compression ratio. Pruning helps to get rid of redundant model parameters through iterative training. However, the resulting network typically has unstructured sparsity in weight connections, thereby not maximizing the amount of weight compression. Moreover, pruning based weight compression starts with a fully dense weight matrix during training and hence compression benefits are realized only for the inference phase.

Various embodiments provide for employing space-efficient hash circuitry to compress the memory size of weights used by DNNs, artificial neural networks, neural networks, convolutional neural network, space invariant artificial neural networks (SIANN), deep Q-network (DQN), and variations thereof with a negligible impact in performance. High compression ratios of the model size can be achieved, resulting in area and energy savings over other weight compression techniques. Compression ratio is defined as the ratio of the compressed model size (NN parameters) to the uncompressed model size.

Various embodiments provide a low silicon footprint system or environment and reconfigurable hashing based weight compression technique to reduce memory footprint at least of DNNs. In some embodiments, the hashing scheme groups a random set of connections into a bucket such that they apply the same weight thereby providing a high compression ratio as a single weight is stored for a bucket of multiple connections. Accordingly, for a DNN, a portion or entirety of a weight matrix for one or more hidden layers can be compressed into a smaller set of weights. The weight matrix can be constructed during runtime of training or inference through use of a hash table, exclusive or (XOR) of one or more entries of the hash table, followed by a weight lookup operation from the smaller set of weights based on the output from the XOR operation. Certain elements in a weight matrix can share the same value thereby reducing the amount of weights that are stored and used during training or inference. During a training phase, a compression scheme can be set for the weight matrix. The same compression scheme can be applied during an inference stage, thereby providing memory compression benefits across both training and inference stages.

Various embodiments can provide high energy savings from reducing memory accesses to an off-chip memory or storage device to access weights. The proposed hashing unit can provide more than 5× energy savings to compute the memory index and fetch a word from local register in contrast to the baseline network that retrieves weights from, e.g., a static random-access memory (SRAM) or an external off-chip memory. Various embodiments are validated on MNIST, CIFAR-10 and TIMIT datasets by employing hashing scheme to compress fully-connected layers. Various embodiments allow over 64-89× reduction in weight memory over baseline networks for different networks such as multi-layer perceptron (MLP) and recurrent networks such as long short-term memory (LSTM). LSTM compressed using hashing technique described herein uses 50× fewer weights to achieve similar classification accuracies for a 2-layer bidirectional network with 256 hidden neurons/layer (84% phoneme classification accuracy as opposed to 86% classification accuracy from baseline network. The 50× compression ratio is similar to a sparse network with 0.6% non-zero weights in terms of memory footprint. Such a sparse network is intractable due to severe degradation in classification accuracies. The 50× compression ratio also roughly translates to 50× improvements in energy savings for external memory access (from DRAM, HBM, etc.) as the models are often stored in external memory and streamed into the accelerator when an inference operation is invoked.

Various embodiments enable structured sparsity in DNNs to enable efficient weight storage. The structured sparsity can be tuned through reconfigurable hashing units to achieve better network performance. Various embodiments can achieve extremely high compression ratios with minimal degradation in performance at no additional memory overhead when compared to other weight compression schemes. The compression scheme is set during training phase and similar benefits in memory compression are achieved during training phase. Furthermore, the reconstruction of the weight matrix leverages compute than memory, thereby providing high energy-efficiency due to very limited amount of memory accesses.

FIG. 1 depicts an example of a fully-connected neural network, although embodiments are not limited to use in this example. A fully-connected neural network includes neurons $a_i^1$ (compute unit) connected with each other through synapses $W_{ij}$ (memory unit). Assuming the number of neurons in the $i^{th}$ fully connected layer of DNN to be $N_1^i$, then the number of synapse connections between $i^{th}$ and $i+1^{th}$ fully connected layer is $N_1^i \times N_1^{i+1}$. As the model size of DNNs increases to cope up with increased size datasets, the amount of memory needed to store the model also increases. However, neural network accelerators are often designed with a fixed memory budget. If the number of synaptic connections between two layers exceeds this budget, portions of the weight matrix are streamed from an off-chip memory to the on-chip memory and computations are performed. The same procedure is followed until the whole weight matrix is received. However, off-chip data movement incurs extremely high energy overheads and can also introduce latency in availability of portions of the weight matrix.

Figure 2:
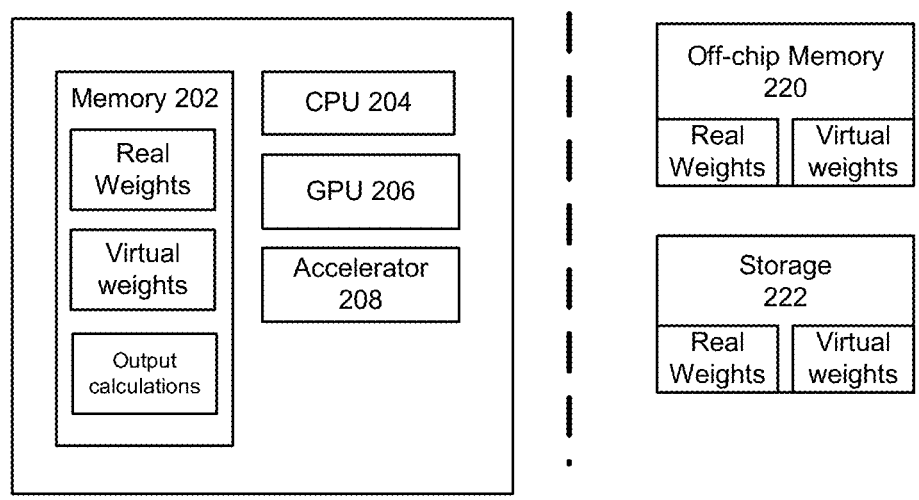
FIG. 2 depicts a system.

FIG. 2 depicts a system in which embodiments can be used. Memory 202 can store real weight values for use in generating one or more virtual weights in a matrix during training or inference. Memory 202 can be a volatile memory (e.g., DRAM, SRAM, cache) and, in some cases, use a high bandwidth memory (HBM) compatible interface, or can be storage class memory (e.g., Intel Optane or Samsung Z-NAND). Storage of weight values on-chip can refer to storage of the weights values in a memory device on the same motherboard, die, or socket as that of the central processing unit (CPU) 204, graphics processing unit (GPU) 206, or accelerator 208 that is to access the weights and perform computation on input values using the weights. An off-chip memory 220 or storage device 222 can be accessed via a bus or interface (e.g., PCIe) and the off-chip memory or storage device is mounted on a separate motherboard, die, or socket as that of the processor, accelerator, GPU, CPU, or core that is to access the weights and perform computation on input values using the weights.

In some embodiments, a CPU can include one or more processor cores. Cores can process instructions which, when executed, perform operations for system and or user software. In some embodiments, at least one of the one or more cores is configured to process a specific instruction set. In some embodiments, instruction set may facilitate Complex Instruction Set Computing (CISC), Reduced Instruction Set Computing (RISC), or computing via a Very Long Instruction Word (VLIW). One or more cores may each process a different instruction set, which may include instructions to facilitate the emulation of other instruction sets. A processor core may also include other processing devices, such as a Digital Signal Processor (DSP).

In some embodiments, one or more cores includes cache memory. Depending on the architecture, one or more cores can have a single internal cache or multiple levels of internal cache. In some embodiments, the cache memory is shared among various components of one or more processor cores. In some embodiments, one or more cores also uses an external cache (e.g., a Level-3 (L3) cache or Last Level Cache (LLC)) (not shown), which may be shared among one or more processor cores using known cache coherency techniques.

Figure 3:
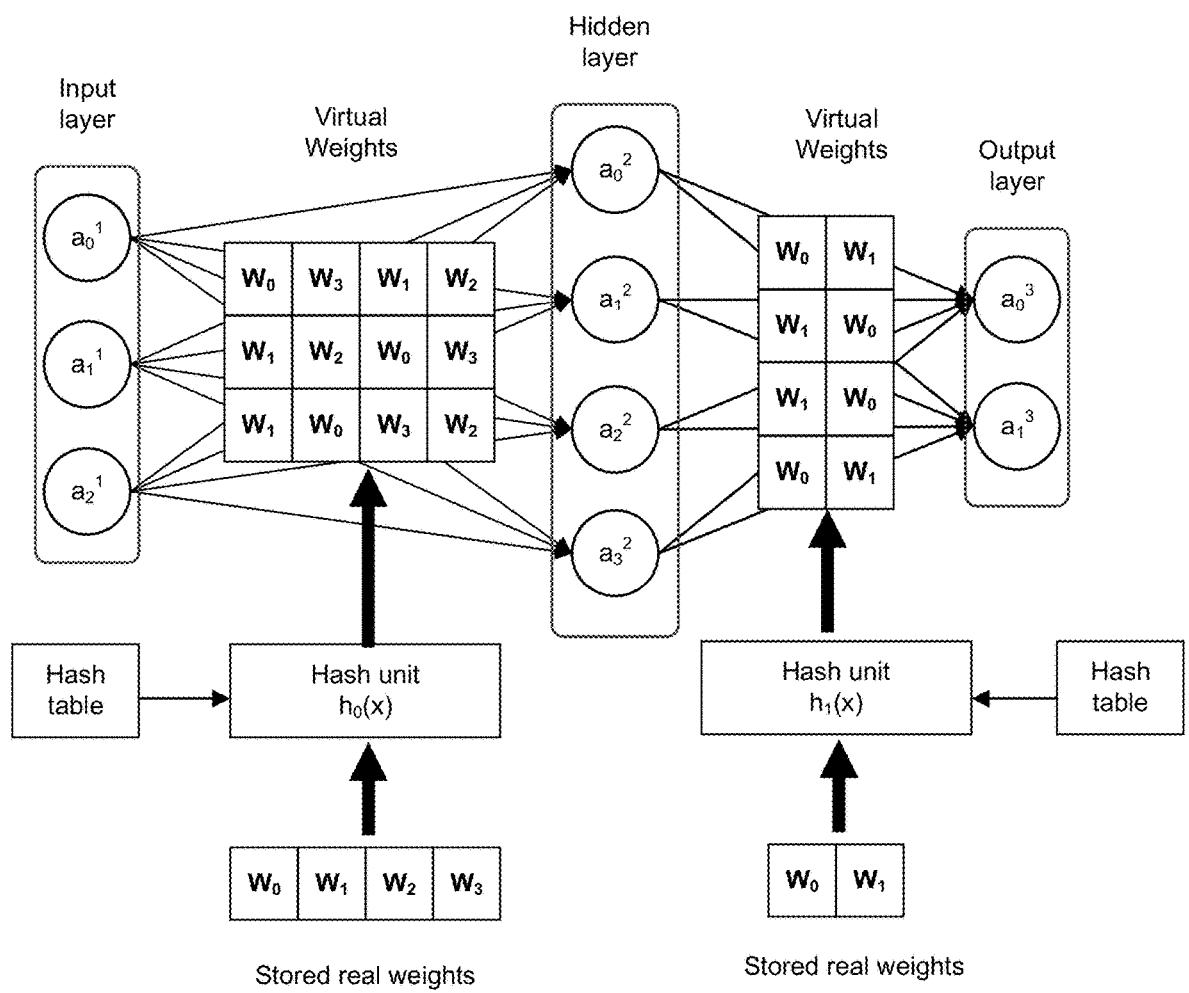
FIG. 3 depicts an example of a hashing-based weight sharing scheme for deep neural networks.

FIG. 3 depicts an example of hashing based weight sharing scheme for DNNs. Various embodiments provide a reconfigurable weight sharing scheme employing hash functions to generate coordinates and values of virtual weights in a matrix. A synaptic weight is grouped into a random set of connections, such that the connections in the same hash bucket share the same weight. A real weight matrix contains the unique weight values and is stored on-chip with the computation engine that performs computations using inputs and weight values. For example, a real weight value can be of any integer (8, 16-bit) or any floating-point precision (half, single or double) number depending on the application and hardware. By contrast, virtual weights can be generated at run-time and do not need to be stored on or off-chip prior to training or inference phases, although a portion of virtual weights can be stored on or off-chip. Virtual weights are determined from real weight values and stored during training. Virtual weights are retrieved from real weights for an inference phase. During runtime of training and inference, the virtual weight matrix used for computation is constructed using the hash units. A hash unit can use a preset hash table retrieved from on-chip memory that contains the mapping between virtual weights ($W_v$) and real weights ($W_r$) and is reconfigurable during a training phase.

The virtual weight matrix is constructed through the equation $W_v(i, j) = W_r[h_1(i, j)]$, where $h_1$ is the hashing function for $l^{th}$ layer. The hash table based weight compression scheme is a manner to represent a hidden layer through a same or different real-virtual weight mapping scheme. In some embodiments, by use of a hash table, mappings of virtual weights in the virtual weight matrix to a real weight can be set as a pseudo-randomly selected real weight. Note that during a training phase, one or multiple tables mapping virtual weights to real weights can be tried and the table that yields the best performance can be selected for use during inference.

Figure 4A:
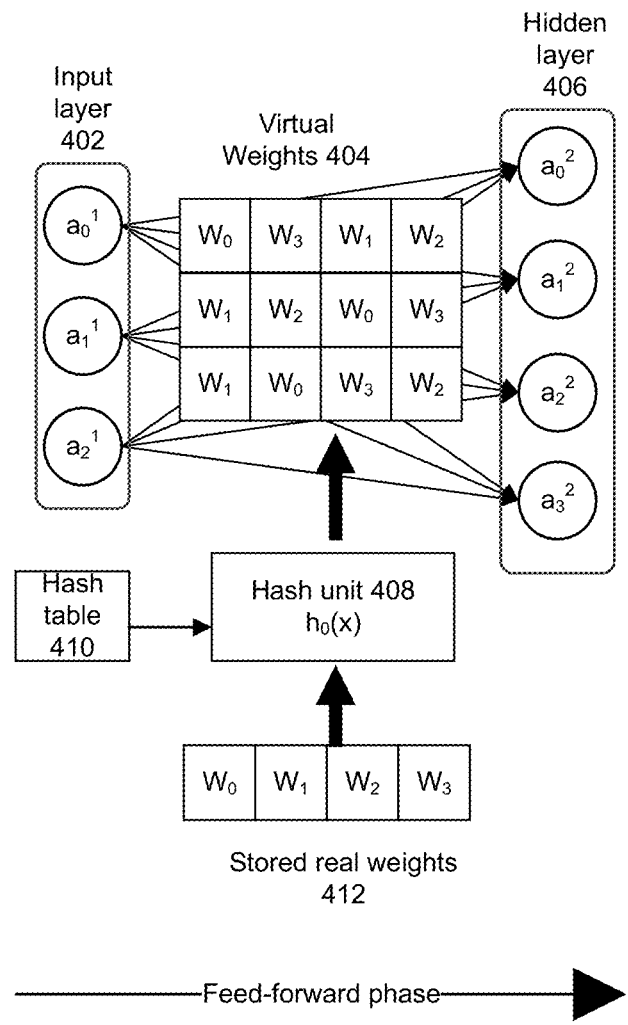
FIG. 4A depicts a feed-forward phase of training intermediate or hidden layers of a neural network.

FIG. 4A depicts a feed-forward phase of training of intermediate or hidden layers of a neural network. In this example, input layer 402 provides variables $a_o^1$ to $a_2^1$ (e.g., neurons). Virtual weights 404 provide a weight matrix of size 3×4 for applied connections with a hidden layer 406. Hidden layer 406 can provide a link to via weighted connections (e.g., synapses) to an output layer or another hidden layer (not shown). An output layer can receive a set of weighted inputs and produce an output through an activation function to provide a prediction or inference. Hash table 410 can represent a pseudo-random selection of indices. In this example, hash unit 408 generates weights in the virtual weights 404 using a hash table 410 to select virtual weights pseudo-randomly from among stored real weights 412. In other words, by use of entries in hash table 410, hash unit 408 can pseudo-randomly select a real weight from among stored real weights 412 for inclusion in virtual weights 404. Stored real weights 412 can be weight values stored in a memory on-chip with a processor or accelerator that is to perform calculations using input variables and virtual weights 404. In this example, four (4) real weights are distributed among twelve (12) virtual weights such that a single real weight is allocated to three (3) virtual weights but in pseudo-random locations. In other examples, available real weights can be unevenly allocated among virtual weights.

Figure 4B:
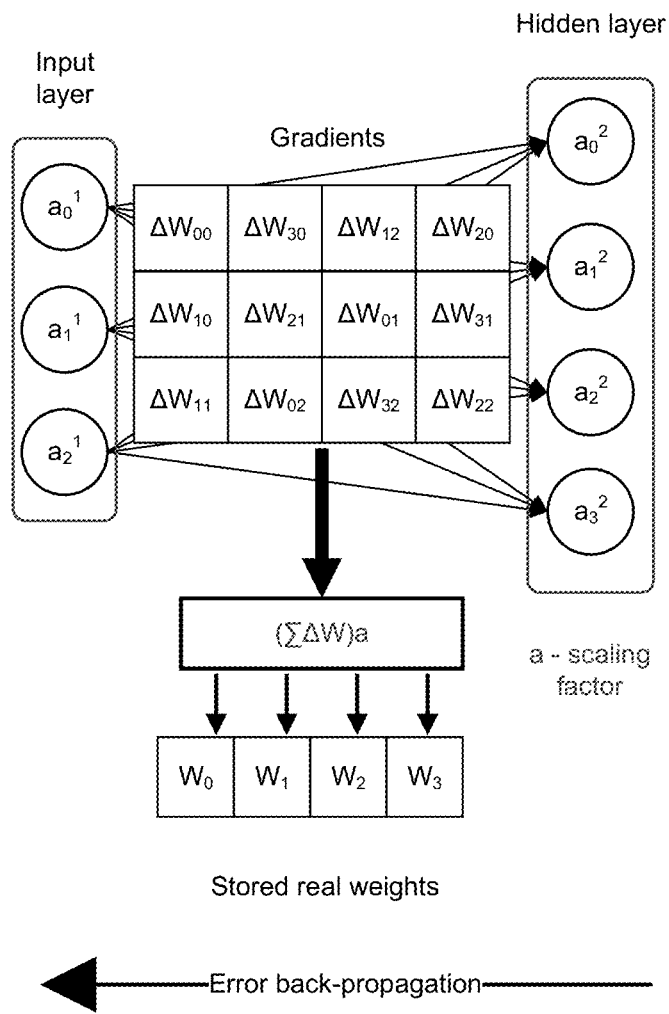
FIG. 4B depicts an example of a training phase of a neural network using error back-propagation.

FIG. 4B depicts an example of a training phase of a neural network using error back-propagation. After a feed forward with full applied weights, there is a comparison of an output with a target output, error back propagation, determination of the delta weights/gradient, and generation of replacement real weight values. Back propagation of error between output and target (e.g., loss function) can be determined using root mean square error, hinge loss and stochastic gradient descent can be applied to correct for error that is a function, determination of a minimum (derivative) of loss function for each parameter. Training of weight matrices of one or more hidden layers can be achieved through other techniques including but not limited to: evolution strategies proposed by OpenAI, convex optimization, discrete optimization, proximal back propagation, direct feedback alignment, genetic algorithms, Markov chain Monte Carlo (MCMC), simulated annealing, simplex, Broyden-Fletcher-Goldfarb-Shanno (BFGS), grid search, among others.

In some examples, after training the neural network, gradients for virtual weights 404 are available. Gradients determined for a virtual weight chosen from the same real weight can be summed together and divided by the number of virtual weights that share the same real weight. For example, gradients $\Delta W_{00}$, $\Delta W_{02}$, and $\Delta W_{01}$ can be summed together and divided by three to provide a resulting value of $W_0$ that overwrites the source $W_0$. Gradients $\Delta W_{10}$, $\Delta W_{11}$, and $\Delta W_{12}$ can be summed together and divided by three to provide a resulting value of $W_1$ that overwrites the source $W_1$. Gradients $\Delta W_{20}$, $\Delta W_{20}$, and $\Delta W_{22}$ can be summed together and divided by three to provide a resulting value of $W_2$ that overwrites the source $W_2$. Gradients $\Delta W_{30}$, $\Delta W_{32}$, and $\Delta W_{31}$ can be summed together and divided by three to provide a resulting value of $W_3$ that overwrites the source $W_3$. The resulting values $W_0$-$W_3$ can be stored into respective stored $W_0$-$W_3$ of real weights 412.

A tabulation hash unit can be used to determine reverse associations between virtual weight locations and source real weight values. During inference, the real weights are loaded and used for the virtual weights based on entries in a hash table and a tabulation hash unit. Hash unit and summer and scaling factor computation can be performed using one or more cores or accelerators with respect to FIG. 2.

Figure 5A:
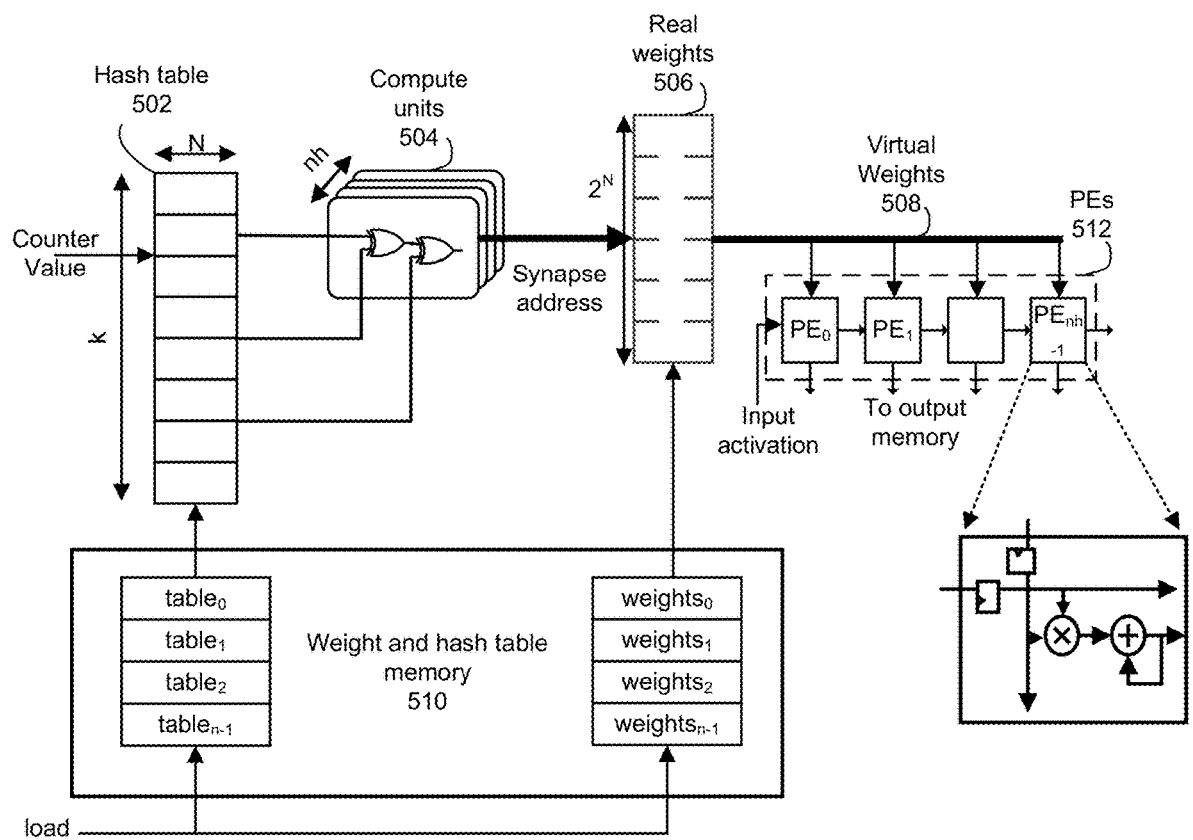
FIG. 5A shows an example high level microarchitecture for use in a hashing-based weight compression scheme.

FIG. 5A shows an example high level microarchitecture for use in a hashing-based weight compression scheme. An example hashing scheme uses a reconfigurable hash table 502 with compute units 504. Hash table 502 can be populated with randomly drawn entries using a table selected from $table_0$ to $table_{n-1}$ from weight and hashing table memory 510. $Table_0$ to $table_{n-1}$ are hash tables that include pseudo-random entries selected from a set of indexes for weights among $weight_0$ to $weight_{n-1}$. A load signal causes hash tables (e.g., $table_0$ to $table_{n-1}$) and weights (e.g., $weight_0$ to $weight_{n-1}$) stored in a register file to be loaded into respective hash table 502 and real weights 506.

Weight and hashing table memory 510 can be located on-chip with compute units 504 and PEs 512 whereby they share the same motherboard, circuit board, and/or physical casing. Use of an XOR tree in compute units 504 to generate a hash can allow for smaller hash table size and less memory use.

A width of entries in hash table 502 (N or n) can be equal to the length of index address of the number of real weight entries from $weights_0$ to $weights_{n-1}$ in the weight and hashing table memory 510. During a training phase (e.g., feed-forward computation), entries in hash table 502 are used to determine the virtual weight indices for mapping an index to a real weight to one or more virtual weights. A counter can be used to keep track of an index of the virtual weight. For a layer having p×q virtual weights, the counter runs from 0 to p*q−1.

A virtual weight has a corresponding memory address whereby a machine learning process or software references the addresses to retrieve weights. According to various embodiments, a counter is derived from the address. In an embodiment, the counter is split into multiple non-overlapping segments through bit-masking and the segmented counters are used as pointers to select entries in hash table 502 to allow for selection of multiple entries of hash table 502 in parallel.

Multiple outputs from hash table 502 are provided to compute units 504. Compute units 504 determine a synapse address of a real weight for use in one or more virtual weights 508. For a three element XOR operation and k=64 entry hash table, three 64-to-1 N-bit multiplexers could be used to provide three entries from the hash table to an XOR operation. In some embodiments, compute units 504 are implemented using exclusive-or (XOR) units that perform calculations using one or more entries retrieved from hash table 502. In this example, 3 N bit entries from the hash table can be XORd together to generate an address or index of a real weight. Computation using compute units 504 provide for tabulation hashing operation on entries from hash table 502. A virtual weight index of length N is provided from an XOR tree operation on entries from hash table 502. Value nh represents a number of hash operations and PEs in parallel. Accordingly, in a single clock cycle, nh parallel XOR operations can be performed to calculate locations (e.g., indexes) of nh real weights. The value of nh is a design choice and can be based on a size of silicon, among other factors.

In some examples, hash table 502 includes k entries, where $k=2^{n/3}$ and n is a number of address bits per counter value. In this example, n=18 and $k=2^{18/3}=64$. A number of hash operations and PEs in parallel=nh. Accordingly, 0:(nh−1) non-overlapping counter values could be used in parallel. In a next cycle, the counter values could range from nh:(2*nh−1). The counter (address) value could continue incrementing until it hits (p*q−1). The counter can be divided into segments of $log_2(k)$ bits. A number of hash table entries read per counter value=$ceil(n/log_2(k))$. In this example, n=18 and k=64 and the number of hash table entries read per counter value=3. Note that as k increases, more hash table memory and fewer hash table entries are read per counter value (for given address width) and fewer XOR circuits can be used.

The virtual weight index from compute units 504 is used to access the real weight values from the weight and hash table memory 510. After values of virtual weights 508 are obtained from real weights, $weights_0$ to $weights_{n-1}$, virtual weights are passed onto processing elements (PEs) 512. PEs 512 provide multiply-and-accumulate (MAC) operations on the virtual weights and input activations. A PE can be implemented as a multiplier and accumulator (MAC) unit. The MAC unit performs xw+partial sum, where the virtual weight is w and x is an input value. An example circuit of a PE is shown in exploded view. The resulting partial sums are written back to memory for use in another layer or output.

The system of FIG. 5A enables single instruction, multiple data (SIMD) operation, as multiple virtual weights can be obtained in parallel by employing multiple XOR tree structures that can operate on pointers fetched from a single hash table.

The system of FIG. 5A enables a modular structure, by time-multiplexing the hashing function across multiple layers of a network or segments within a layer. For example, one hash table is loaded into the system from an external memory or on-chip memory or storage. The corresponding compressed weights (real weights) are also loaded into the system memory from the same or different memory as that which stores the hash table. Computations are performed using PE units and the next set of hash tables and compressed (real weights) weights are loaded into the system.

Figure 5B:
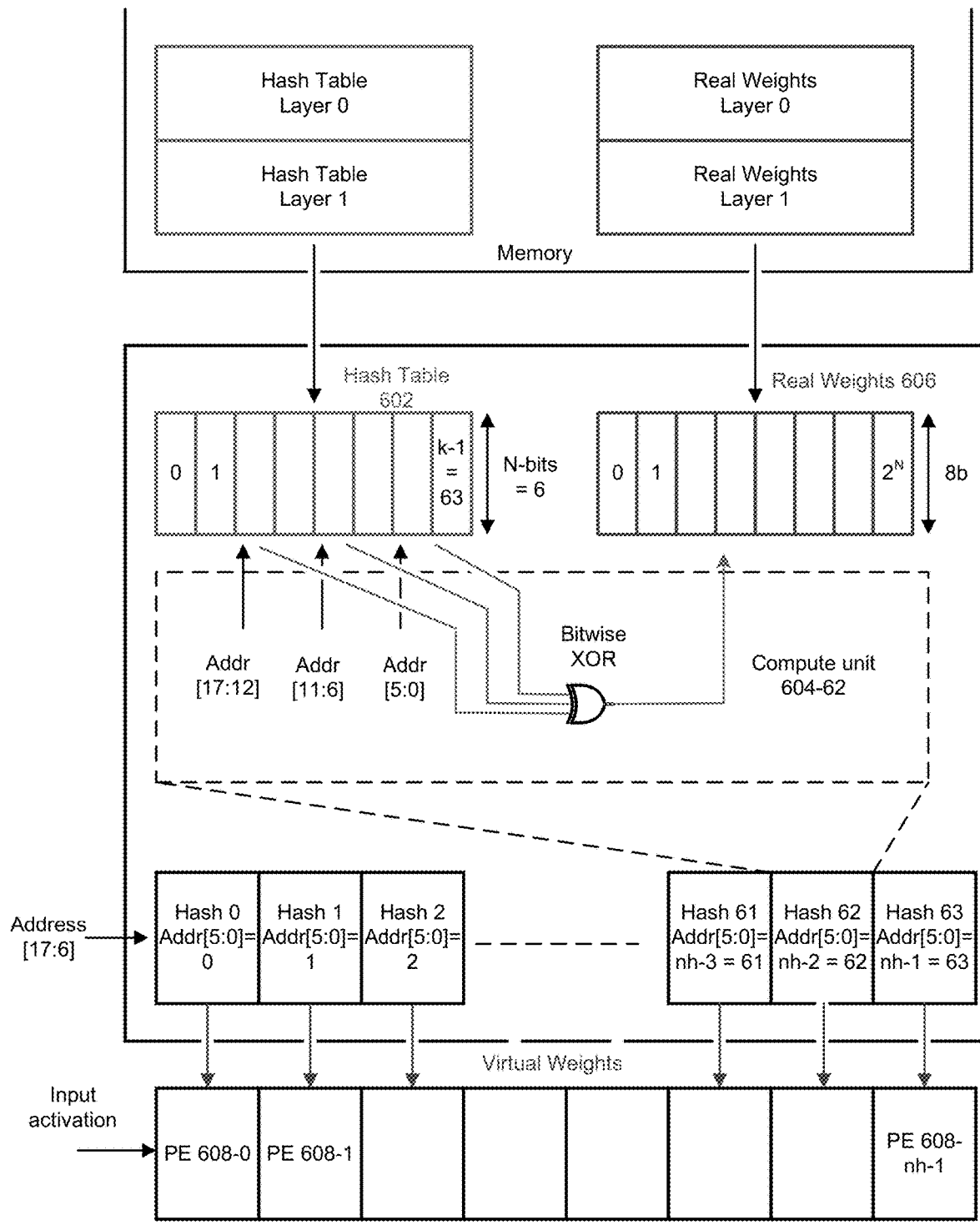
FIG. 5B depicts an example of a manner to determine multiple virtual weights in parallel by use of multiple compute units.

FIG. 5B depicts an example of a manner to determine multiple virtual weights in parallel by use of multiple compute units. In this example, a memory address of a virtual weight is 18 bits (addr [17:0]). In this example, addr[17:12], addr[11:6], and addr[5:0] can be used as pointers to entries in hash table 602. The addr[5:0] represents a column within a row and is allocated to parallel compute units 604-0 to 604-63. The addr[17:6] can be incremented through all possible values that would generate all combinations of all possible values of addr[17:12] and addr[11:6]. The addr[17:6] represents a "row" of a memory to be read such that the counter of addr[17:6] is incremented to advance to another row. Compute units 604-0 to 604-63 compute addresses of real weights for virtual weights. Accordingly, virtual weight addresses of all columns of a row can be determined in parallel by compute units 604-0 to 604-63. An example compute unit is shown for compute unit 604-62 that is associated with a virtual weight in column number 62. Virtual weight addresses can correspond to a real weight address in real weights 606. Real weight values of all columns of a row can be output in parallel to processing engines 608-0 to 608-nh−1, where the real weight values are the values of virtual weights. Processing engines 608-0 to 608-nh−1 can perform multiply and carry operations using the virtual weights and input activation values.

Figure 6A:
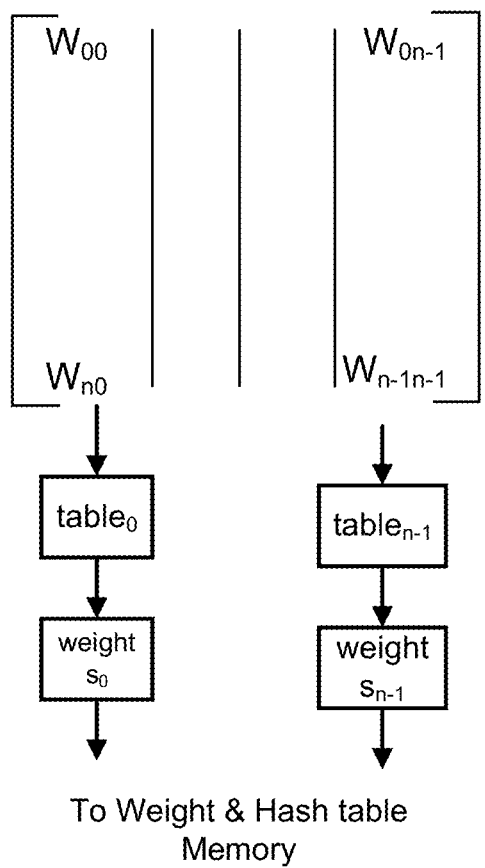
FIGS. 6A and 6B provide an example of data-parallel architecture employing retrieval and processing of virtual weights.
Figure 6B:
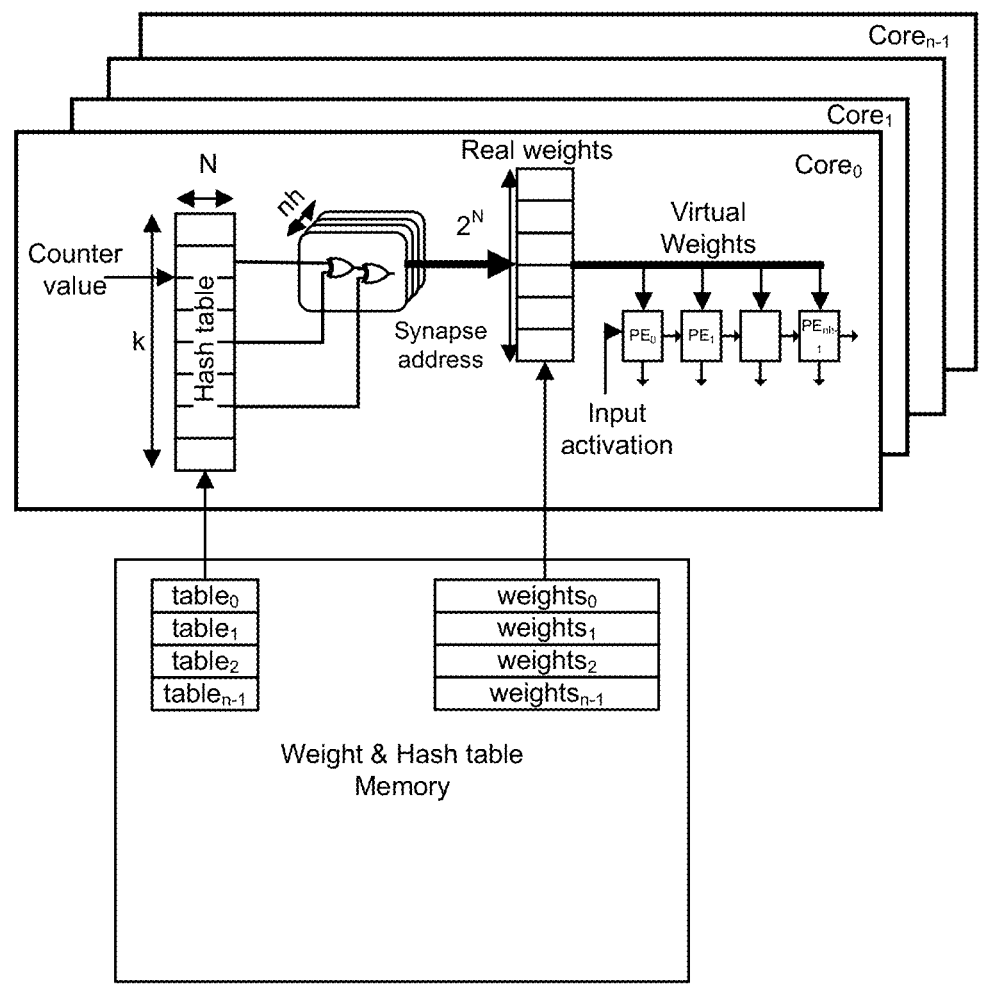

FIGS. 6A and 6B provide an example of data-parallel architecture employing retrieval and processing of virtual weights using multiple cores, accelerators, or processing devices. If a neural network layer is large with many virtual weight values in its matrix, the two-dimensional weight matrix can be split up into different chunks with separate hash tables and real weights. The virtual weight calculations for various chunks can be performed in parallel on multiple different cores. For example, columns of virtual weights in a virtual weight matrix can be mapped to different cores to allow dot-product computations on different cores in parallel. Each chunk can be mapped to real weights using a hash table and the same or different hash tables can be used across multiple chunks. Chunks of weights and related computation can be data independent and do not need data-movement among cores to allow parallel operation.

For a compute unit with 3 XOR units receiving three entries from k=64 sized hash table, three 64:1 multiplexers can be used to control which values to output to nh compute units (e.g., XOR). However, the silicon area needed for three 64:1 multiplexers may be excessive. Various embodiments provide another manner of selecting entries from a hash table that can result in 40% savings in area and power savings over the baseline three 64-to-1 multiplexer scheme.

Figure 7:
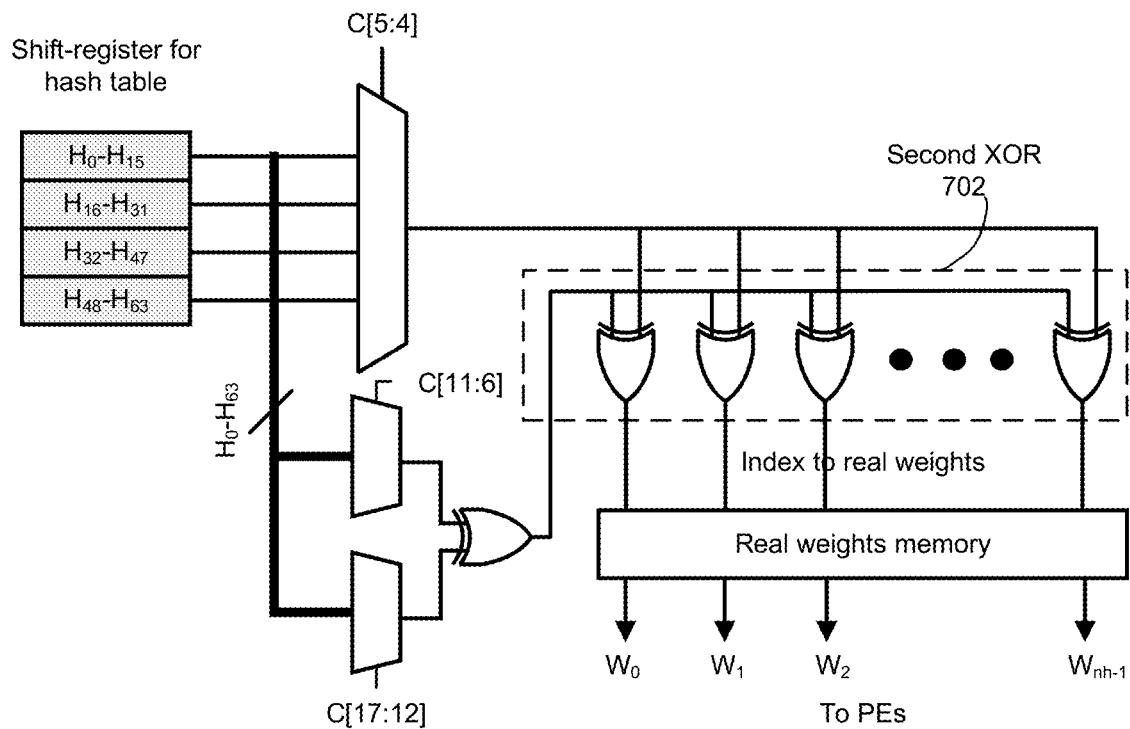
FIG. 7 depicts an example of a multiplexer tree.

In some embodiments, in a case where multiple replicas of compute elements are used, a starting counter to an entry in a hash table can be set to the nearest multiple of nh, where nh is the number of replicas of compute elements. In other words, a virtual weight address is set so that the starting address for a parallel computation unit is an integer multiple of nh. This property enforces all the nh counters to have the same value in all bit positions except the least-significant nh bits. Hence, the resulting multiplexer tree for the corresponding sub-ranged word can be implemented as a shift-register and a small multiplexer tree as shown in FIG. 7. Other sub-ranged words in the pointer are constant for the parallel compute units and hence the multiplexer tree that receives outputs from the hash table for the parallel compute units can be shared. The outputs from the multiplexer trees are XORed using the compute units to obtain the memory index, which in turn is used to index the real weights to obtain the virtual weights. The virtual weights are then sent to processing elements (e.g., MAC devices) for computation using input values.

For example, the hash table can be split into 4 groups of 16 entries (e.g., entries 0-15, 16-31, 32-47, and 48-63) for the number of parallel units nh=16. In this example, the counter value is an 18 bit value and has 0000 in its least significant bits C[3:0]. Counter bits C[5:4] can be used as an index into which hash table entries to use (e.g., H0-H15, H16-31, H32-H47, or H48-H63). Counter bits C[11:6] can represent a compute index to select one out of 64 entries in hash table. Counter bits C[17:12] can also represent a compute index to select one out of 64 entries in hash table. XOR operations performed between entries selected by counter bits C[11:6] and counter bits C[17:12] are output and fed as an input to second XOR 702. Second XOR 702 performs a XOR between a 16 entry group selected by counter bits C[5:4] and an output from a XOR operation of counter bits C[11:6] and counter bits C[17:12]. The output from second XOR 702 provides indexes to real weights to select real weights for providing to processing elements (PEs).

Figure 8:
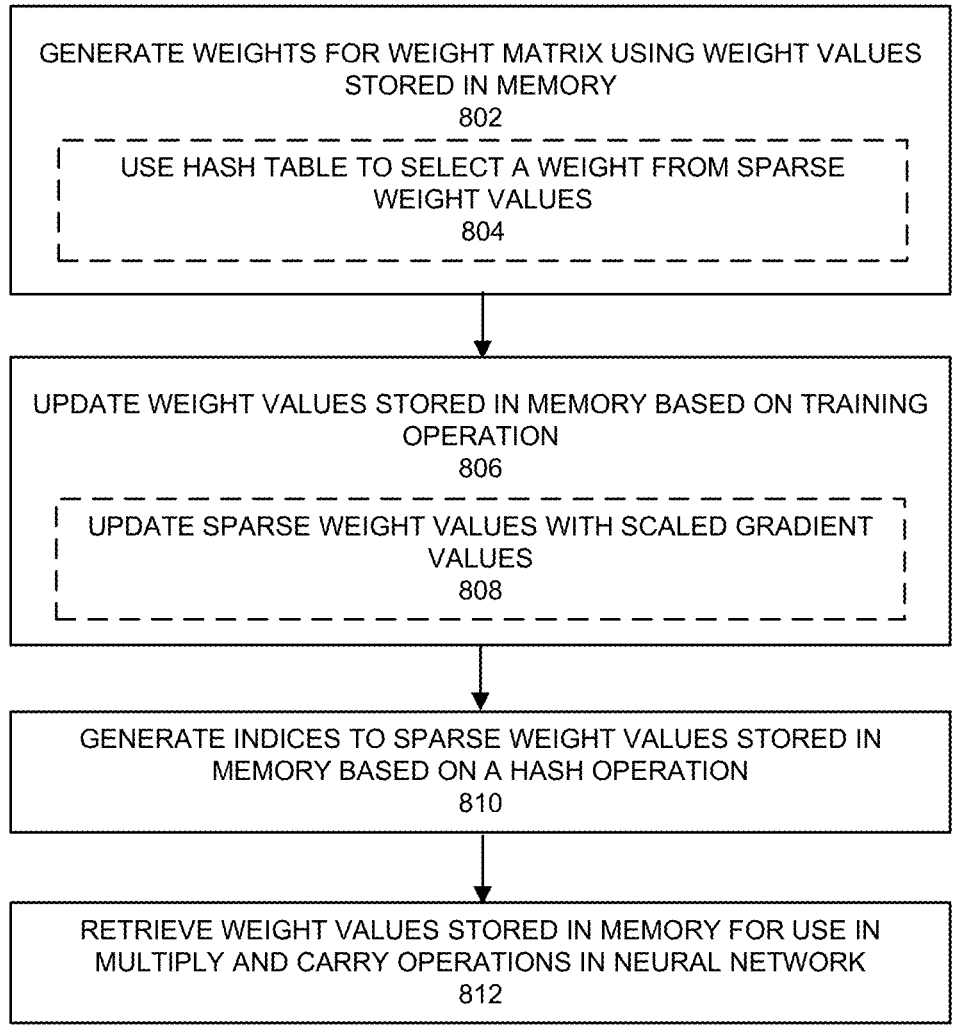
FIG. 8 depicts a process that can be used to provide weights in a weight matrix from a compact set of weights for a neural network.

FIG. 8 depicts a process that can be used to allocate weights in a weight matrix from a compact set of stored weights for a neural network. Actions 802-808 can be used in training. At 802, the process can generate weights for a matrix using weight values stored in memory. For example, action 802 can include action 804, whereby the process uses a hash calculation to select a weight value from among a sparse set of weights. The number of sparse weights can be less than a number of weights in the weight matrix. The hash calculation can be a tabulation hash calculation involving use of XOR operations. The hash calculation can use two or more entries of a hash table where the entries are pseudo-random values selected from a number of weights in a set of sparse weight values. The sparse set of weights can be stored on-chip with processing elements that perform multiplication (e.g., matrix multiplication) using the weights.

At 806, the process can update weight values stored in the sparse weight values based on a training operation. For example, as a result of training a neural network, gradient values can be back-propagated and used to modify the sparse weight values. For example, action 806 can include action 808. At action 808, resulting gradient values for weights in the weight matrix associated with the same sparse weight value can be summed together, scaled by dividing by a number of weights that share the same sparse weight value, and the resulting value stored in the sparse weight value. Other scaling values can be used.

Actions 810 to 812 can be used for inference. At 810, the process can generate indices to sparse weight values stored in memory based on a hash operation. For example, tabulation hash techniques can be used to select two or more entries from a hash table and XOR the entries together. The entries can represent random selection of weights from the set of sparse weights determined in 806 and 808. At 812, the weights can be retrieved from memory that is on the same die or board as that of compute elements that perform XOR operations and processing elements that perform multiplication. Multiple weights from the sparse weights can be retrieved in parallel and provided for parallel multiply and carry operations. Various systems and architectures described herein can be used for determination of spare weight values in parallel using a hash table and XOR operations.

Figure 9:
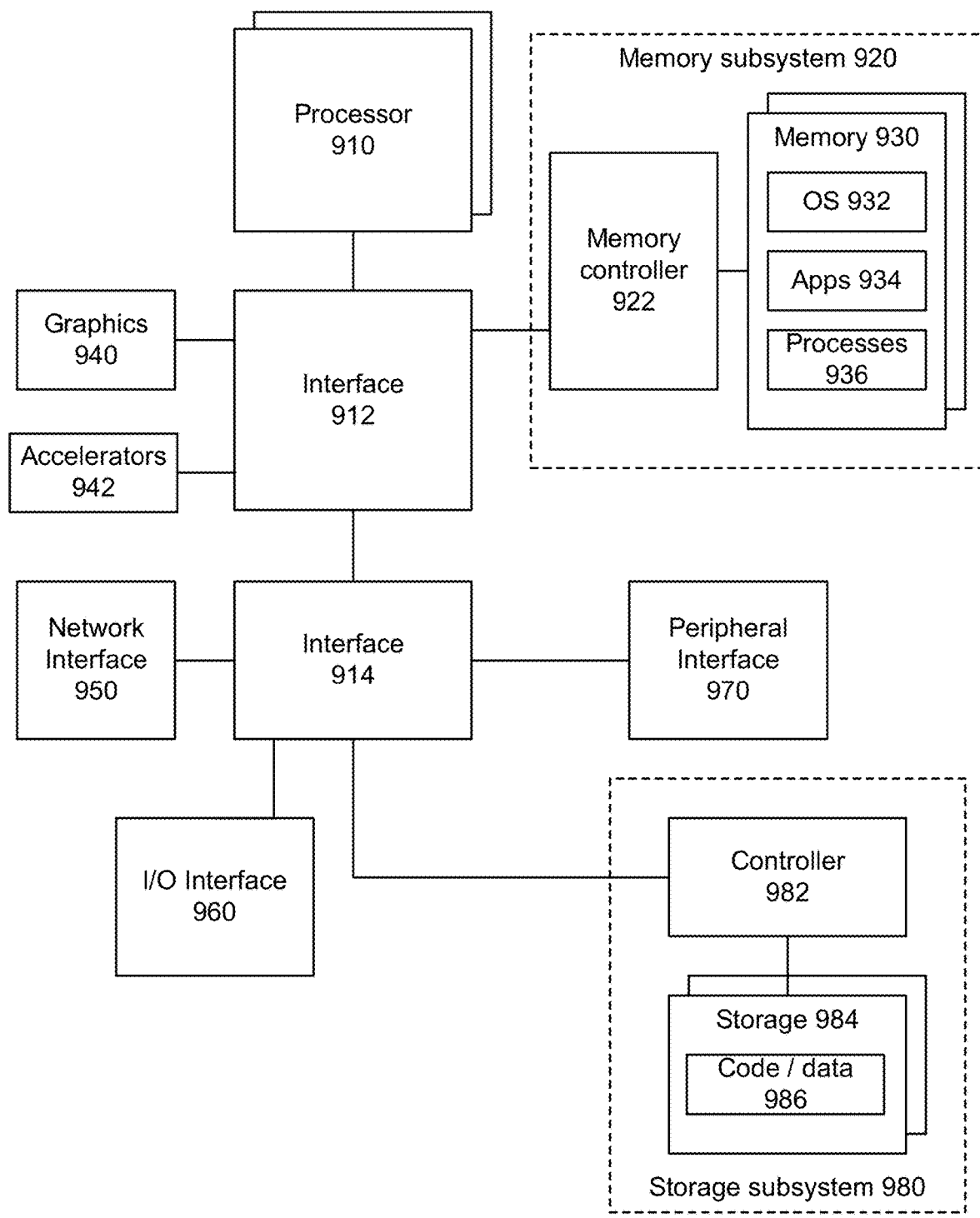
FIG. 9 depicts a system.

FIG. 9 depicts a system. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Various embodiments described herein can be used by a processor 610, graphics 640, and/or accelerators 942 to determine weights to use for a neural network where weights are stored in memory 930.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, volatile memory, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/Output version 2, JESD229-2 originally published by JEDEC in August 2014, HBM (High Bandwidth Memory, JESD325, originally published by JEDEC in October 2013, LPDDR5 (currently in discussion by JEDEC), HBM2

(HBM version 2), currently in discussion by JEDEC, or others or combinations of memory technologies, and technologies based on derivatives or extensions of such specifications. The JEDEC standards are available at www.jedec.org.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAIVI, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a neural-network inference engine comprising: a processor configured to generate weights for a matrix of at least one hidden layer of a neural network based on a tabulation hash operation using entries from a table to select from a set of weights, wherein the table is associated with the at least one hidden layer and the set of weights comprises a smaller number of weights than a number of the weights for the matrix of at least one hidden layer and a memory located on-chip with the processor, the memory configured to store the table and the set of weights.

Example 2 includes a neural-network inference engine of any claim, wherein the table is to group weights of the matrix into a pseudo-random set of connections and the connections in a same hash bucket share a same weight from the set of weights.

Example 3 includes a neural-network inference engine of any claim, wherein the weights for the matrix of at least one hidden layer comprise a set of one or more weights that are a single weight value from the set of weights.

Example 4 includes a neural-network inference engine of any claim and includes an XOR-tree to perform an XOR operation on at least two entries from the table.

Example 5 includes a neural-network inference engine of any claim, wherein the memory is configured to store at least one table for the hidden layer and at least one table for a second hidden layer.

Example 6 includes a neural-network inference engine of any claim, wherein the processor is to perform at least one multiply-and-carry operation to compute a value based on a weight of the matrix and an input activation value.

Example 7 includes a neural-network inference engine of any claim, wherein an address is associated with a weight of the matrix and includes: a multiplexer to transfer entries from the table for the tabulation hash operation, wherein the multiplexer comprises: at least one shift register to shift contents of the table based on a first portion of the address of the weight; a second multiplexer to output contents from at least one shift register based on a second portion of the address of the weight; a third multiplexer to output contents from at least one shift register based on a third portion of the address of the weight; an XOR logic to perform an XOR operation on outputs from the second and third multiplexers and generate an output; and a second XOR logic to perform an XOR operation on an output from the XOR logic and shifted contents of the table.

Example 8 includes a neural-network inference engine of any claim, wherein when the neural-network inference engine operates in a training mode, the processor is to: determine an index of a single weight value in the set of weights; set two or more weights of the matrix based on the single weight value; determine a gradient of the two or more weights; and replace the single weight value with a sum of gradients of the two or more weights divided by a number of the two or more weights.

Example 9 includes a neural-network inference engine of any claim, wherein when the neural-network inference engine operates in an inference mode, the processor is to: determine an index of a single weight value in the set of weights; set two or more weights of the matrix based on the single weight value; and perform a multiply-and-carry operation using the single weight value and an activation signal.

Example 10 includes a neural-network inference engine of any claim and includes one or more of: an inference engine accelerator, graphics processing unit, network interface, or a storage device.

Example 11 includes a method comprising: during an inference phase of a neural network: selecting a first weight in a matrix of weights from a set of weights stored in memory based on a tabulation hash of multiple entries from a table; and selecting a second weight in the matrix of weights from the set of weights stored in memory based on a second tabulation hash of multiple entries from the table, wherein: a number of weights in the matrix of weights is greater than the set of weights stored in a memory and the table is stored in a memory.

Example 12 includes a method of any example and includes performing a tabulation hash on multiple entries from the table to generate an index to a weight in the set of weights stored in memory.

Example 13 includes a method of any example, wherein the tabulation hash comprises an XOR operation on two entries from the table and a second XOR operation on an output from the XOR operation and a third entry from the table.

Example 14 includes a method of any example and includes selecting a second table; performing a third tabulation hash based on entries from the second table to generate an index to a weight in the set of weights stored in a memory; and setting a third weight based on the index from the third tabulation hash based on entries from the second table.

Example 15 includes a method of any example and includes performing multiply and carry operations based on an input activation and the first and second weights and storing outputs from the multiply and carry operations into memory.

Example 16 includes a method of any example and includes selecting entries from the table based on non-overlapping portions of an address of the first weight for use in the tabulation hash and selecting entries from the table based on non-overlapping portions of an address of the second weight for use in the second tabulation hash.

Example 17 includes a method of any example and includes allocating a first core for selecting the first weight in the matrix of weights and selecting the second weight in the matrix of weights and performing multiply and carry calculations using the first and second weights and allocating a second core for selecting a third weight in a matrix of weights and selecting a fourth weight in the matrix of weights and performing multiply and carry calculations using the third and fourth weights.

Example 18 includes a system to perform neural-network inferences, the system comprising: a memory; at least one core communicatively coupled to the memory, wherein the memory and the at least one core are mounted to the same board; and an accelerator device to: perform tabulation hashes of entries in a table to generate indices and form a matrix of weights using a set of weights and based on indices from the tabulation hashes of entries in the table, wherein a number of weights in the set of weights is less than a number of weights in the matrix of weights.

Example 19 includes a system of any example, wherein a tabulation hash comprises an XOR operation on two entries from the table and a second XOR operation on an output from the XOR operation and a third entry from the table.

Example 20 includes a system of any example, wherein the acceleration device is to: perform multiply and carry operations based on an input activation and the matrix of weights and store outputs from the multiply and carry operations into the memory.

Example 21 includes a system of any example, wherein the table is stored in the memory and the table comprises indexes randomly selected from a number of weights in the set of weights.

What is claimed is:

1. A neural-network inference engine comprising:
a processor configured to generate weights for a matrix of
   at least one hidden layer of a neural network based on
   a tabulation hash operation based on entries from a table to select from a set of weights, wherein the table is associated with the at least one hidden layer and the set of weights comprises a smaller number of weights than a number of the weights for the matrix of at least one hidden layer and wherein during a neural-network inference mode, the processor is to:

determine an index of a single weight value in the set of weights;

set two or more weights of the matrix based on the single weight value; and perform a multiply-and-carry operation based on the single weight value and an activation signal; and at least one memory located on-chip with the processor, the at least one memory configured to store the table and the set of weights.

2. The neural-network inference engine of claim 1, wherein the table is to group weights of the matrix into a pseudo-random set of connections and the connections in a same hash bucket share a same weight from the set of weights.

3. The neural-network inference engine of claim 1, wherein the weights for the matrix of at least one hidden layer comprise a set of one or more weights that are a single weight value from the set of weights.

4. The neural-network inference engine of claim 1, comprising:

circuitry to perform an XOR operation on at least two entries from the table.

5. The neural-network inference engine of claim 1, wherein the at least one memory is configured to store at least one table for the hidden layer and at least one table for a second hidden layer.

6. The neural-network inference engine of claim 1, wherein the processor is to perform at least one multiply-and-carry operation to compute a value based on a weight of the matrix and an input activation value.

7. The neural-network inference engine of claim 1, wherein an address is associated with a weight of the matrix and comprising:

a multiplexer to copy entries from the table for the tabulation hash operation, wherein the multiplexer comprises:

at least one shift register to shift contents of the table based on a first portion of the address of the weight;

a second multiplexer to output contents from at least one shift register based on a second portion of the address of the weight;

a third multiplexer to output contents from at least one shift register based on a third portion of the address of the weight;

circuitry to perform an XOR operation on outputs from the second and third multiplexers and generate an output; and second circuitry to perform an XOR operation on an output from the circuitry and shifted contents of the table.

8. The neural-network inference engine of claim 1, wherein during a neural-network training mode, the processor is to:

determine an index of a single weight value in the set of weights;

set two or more weights of the matrix based on the single weight value;

determine a gradient of the two or more weights; and replace the single weight value with a sum of gradients of the two or more weights divided by a number of the two or more weights.

9. The neural-network inference engine of claim 1, comprising one or more of: an inference engine accelerator, graphics processing unit, network interface, or a storage device.

10. A method comprising:

during an inference phase of a neural network:

performing a tabulation hash on multiple entries from a table to generate an index to a weight in a set of weights stored in at least one memory;

selecting a first weight in a matrix of weights from the set of weights stored in the at least one memory based on the tabulation hash of multiple entries from a table; and selecting a second weight in the matrix of weights from the set of weights stored in the at least one memory based on a second tabulation hash of multiple entries from the table wherein:

a number of weights in the matrix of weights is greater than the set of weights stored in the at least one memory and the table is stored in the at least one memory.

11. The method of claim 10, wherein the tabulation hash comprises an XOR operation on two entries from the table and a second XOR operation on an output from the XOR operation and a third entry from the table.

12. The method of claim 10, comprising:

selecting a second table;

performing a third tabulation hash based on entries from the second table to generate an index to a weight in the set of weights stored in the at least one memory; and setting a third weight based on the index from the third tabulation hash based on entries from the second table.

13. The method of claim 10, comprising:

performing multiply and carry operations based on an input activation and the first and second weights and storing outputs from the multiply and carry operations into the at least one memory.

14. The method of claim 10, comprising:

selecting entries from the table based on non-overlapping portions of an address of the first weight for use in the tabulation hash and selecting entries from the table based on non-overlapping portions of an address of the second weight for use in the second tabulation hash.

15. The method of claim 10, comprising:

allocating a first core for selecting the first weight in the matrix of weights and selecting the second weight in the matrix of weights and performing multiply and carry calculations using the first and second weights and allocating a second core for selecting a third weight in a matrix of weights and selecting a fourth weight in the matrix of weights and performing multiply and carry calculations using the third and fourth weights.

16. A system to perform neural-network inferences, the system comprising:

at least one memory;

at least one core communicatively coupled to the at least one memory, wherein the at least one memory and the at least one core are mounted to the same board; and an accelerator device to:

perform tabulation hashes of entries in a table to generate indices;

form a matrix of weights using a set of weights and based on indices from the tabulation hashes of entries in the table, wherein a number of weights in the set of weights is less than a number of weights in the matrix of weights, wherein during a neural-network training mode, the accelerator device is to:
  determine an index of a single weight value in the set of weights;
  set two or more weights of the matrix based on the single weight value;
  determine a gradient of the two or more weights; and
  replace the single weight value with a sum of gradients of the two or more weights divided by a number of the two or more weights.

17. The system of claim 16, wherein a tabulation hash of the tabulation hashes comprises an XOR operation on two entries from the table and a second XOR operation on an output from the XOR operation and a third entry from the table.

18. The system of claim 16, wherein the accelerator device is to:
  perform multiply and carry operations based on an input activation and the matrix of weights and
  store outputs from the multiply and carry operations into the at least one memory.

19. The system of claim 16, wherein the table is stored in the at least one memory and the table comprises indexes randomly selected from a number of weights in the set of weights.

20. The method of claim 10, comprising:
  during a neural-network inference mode:
    determining an index of a single weight value in the set of weights;
    setting two or more weights of the matrix based on the single weight value; and
    performing a multiply-and-carry operation based on the single weight value and an activation signal.

21. The method of claim 10, comprising:
  during a neural-network training mode:
    determining an index of a single weight value in the set of weights;
    setting two or more weights of the matrix based on the single weight value;
    determining a gradient of the two or more weights; and
    replacing the single weight value with a sum of gradients of the two or more weights divided by a number of the two or more weights.

22. The system of claim 16, wherein during a neural-network inference mode, the accelerator device is to:
  determine an index of a single weight value in the set of weights;
  set two or more weights of the matrix based on the single weight value; and
  perform a multiply-and-carry operation based on the single weight value and an activation signal.

* * * * *